United States Patent [19]

Reeves

[11] 4,443,948
[45] Apr. 24, 1984

[54] INTERNAL GEOMETRY TOOL

[76] Inventor: Richard Reeves, 61 Dines Close, Wilstead, Bedford, England

[21] Appl. No.: 304,958

[22] Filed: Sep. 23, 1981

[30] Foreign Application Priority Data

Nov. 11, 1980 [GB] United Kingdom ............... 8036116

[51] Int. Cl.³ .......................... G01B 7/12; G01B 7/28
[52] U.S. Cl. .................................. 33/178 E; 33/178 F
[58] Field of Search ......................... 33/178 E, 178 F

[56] References Cited

U.S. PATENT DOCUMENTS

| 2,497,990 | 2/1950  | Huber et al. | 33/178 F |
| 2,649,786 | 8/1953  | Goble        | 33/178 F |
| 2,815,578 | 12/1957 | Broussard    | 33/178 F |
| 2,908,085 | 10/1959 | Price et al. | 33/178 F |
| 3,755,908 | 9/1973  | Ver Nooy     | 33/178 F |
| 3,940,855 | 3/1976  | Ver Nooy et al. | 33/178 F |
| 4,186,494 | 2/1980  | Edouard et al.  | 33/178 F |

FOREIGN PATENT DOCUMENTS

| 566226 | 4/1958 | Belgium | 33/178 F |
| 438777 | 1/1975 | U.S.S.R. | 33/178 F |

Primary Examiner—Richard R. Stearns
Attorney, Agent, or Firm—Watson, Cole, Grindle & Watson

[57] ABSTRACT

A pig for monitoring the internal surface profile of a pipeline carries a plurality of sensors to trace the surface as the pig traverses the pipeline. Output signals from the sensors are compared with an expected value and a reference signal generated when they differ by more than a predetermined amount. The sensor signals are recorded simultaneously with the reference signal.

1 Claim, 16 Drawing Figures

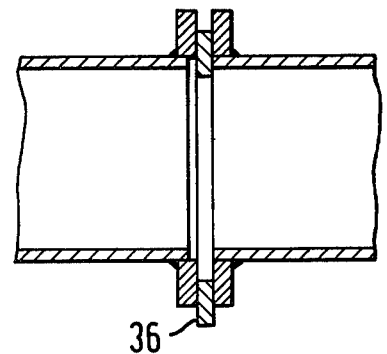
FIG. 10
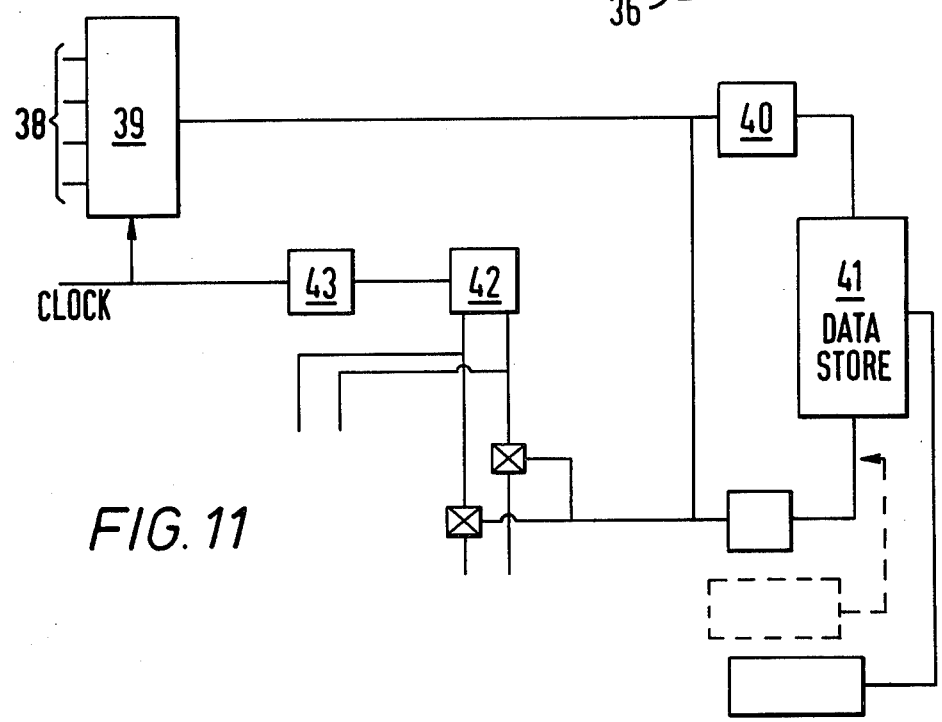
FIG. 11
FIG. 12
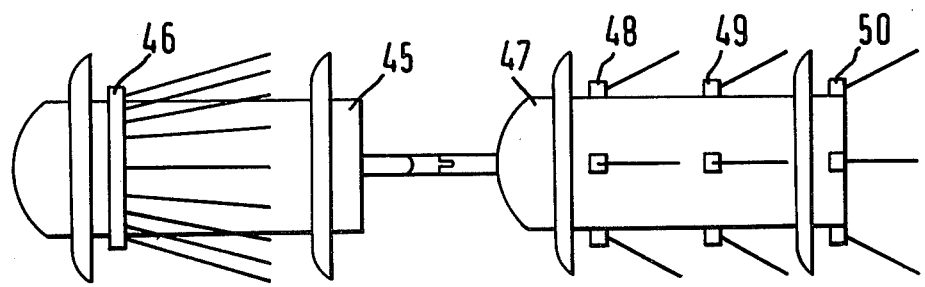

INTERNAL GEOMETRY TOOL

DESCRIPTION

This invention relates to apparatus for monitoring the internal surface topography of tube or pipes, and to inspection methods using such apparatus. It finds particular application in the inspection of pipelines for the transport of fluids.

Pipelines for the transport of fluids are frequently buried beneath the ground or are submerged under water. Because there are usually large distances between access points, it is not feasible to carry out a visual inspection of the state of the internal surface of such pipelines, and thus other means must be employed. In such cases it is usual to drive a vehicle, known as a pig, carrying inspection devices through the pipeline. Output signals from the inspection devices may be stored in an onboard memory device such as a magnetic tape recorder or transmitted directly by radio or cable to a remote data processor. One such inspection pig is described in my U.K. Pat. No. 1,586,581 which discloses a probe system which measures magnetic field strength as the pig passes down the pipeline. The measurements are subsequently used to monitor variations in the surface profile.

Another form of inspection pig is disclosed in U.K. Pat. No. 1,299,321 (U.S. Pat. No. 3,755,908). This pig has a flexible cup which bears against the surface of the pipeline. The body of the pig carries a number of radial, pivotally mounted feeler arms, the free ends of which bear against the periphery of the flexible cup. Transducers are coupled to these feeler arms and their output signals provide an indication of the displacement of the feeler arms when the cup is distorted by variations in the topography as the pig traverses the pipeline. Although this arrangement obviates wear on the feeler arms, it suffers from the disadvantage that the curvature of the cup adjacent the ends of the probe arm is low and hence the system is insensitive to rapid variations in surface profile. Furthermore, the curvature (and hence the sensitivity) varies as the cup flexes.

In order to make a useful measurement of the profile of a pipeline at a given location, it is necessary to record the position of a minimum number, typically twenty-four, of points on its surface with respect to a predetermined datum surface. The length of a pipeline run may be of the order of 80 Km; if measurements are made to an accuracy of 1 mm in a range +50 mm and the measurements are repeated every 10 mm along the pipeline, this would necessitate recording approx. $4 \times 10^9$ data bits. These data all need to be examined to trace specific features of the internal surface topography of the pipeline and such examination takes a substantial time. We have found that by simultaneously processing the data and recording additional parameters, a significant reduction is effected in the time required for subsequent analysis of the recorded data.

Accordingly the present invention provides apparatus for monitoring the topography of the internal surface of a tube or pipe comprising a body or carrier member, drive means for driving the body or carrier member axially through the tube or pipe, a plurality of sensor means mounted on said body or carrier member successively to monitor a corresponding plurality of points of intersection of said internal surface with a reference plane which is fixed with respect to the principal axis of said body or carrier member as said body or carrier member moves through said pipe or tube, recording means coupled to said sensor means successively to store data dependent on the instantaneous output signals from said sensor means and threshold detector means coupled to at least one of said plurality of sensor means to pass a signal to said recording means when the or one of the sensor means connected thereto exceeds a predetermined value.

According to a further aspect the invention provides a method of monitoring the topography of the internal surface of a tube of pipeline comprising causing a body or carrier member having mounted thereon or attached thereto a plurality of sensor means to traverse said tube or pipeline, successively measuring with said sensor means the points of intersection of said internal surface with a reference plane which is fixed with respect to the principal axis of said body or carrier member, monitoring the departure from a predetermined value of the measurements and recording the output of said sensor means together with an indication of the incidence of departures of the measurements from the predetermined value.

These and further aspects of the invention will now be described with reference to the accompanying drawings in which.

Figure 6A:
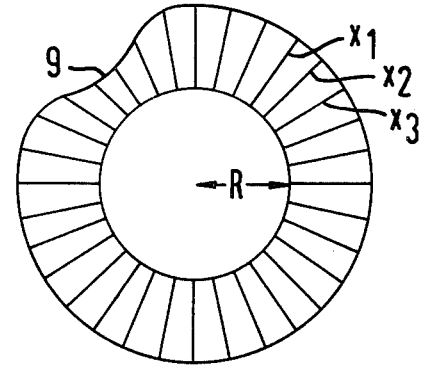
Figure 6B:
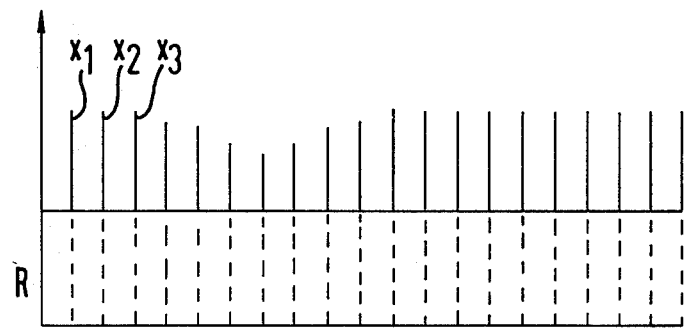
Figure 6C:
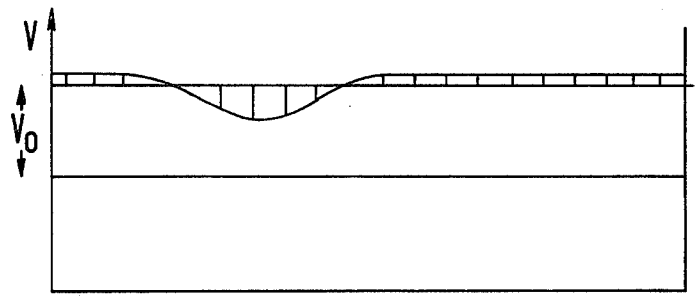
Figure 7:
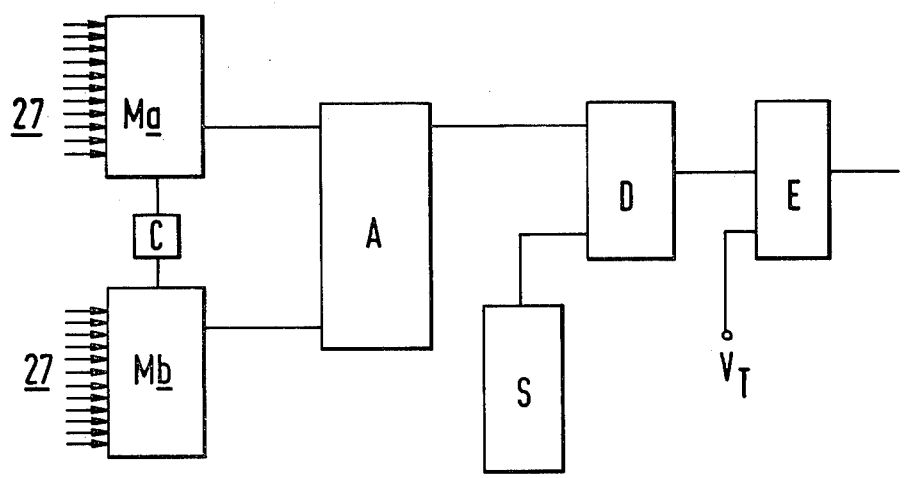
Figure 8:
Figure 8:
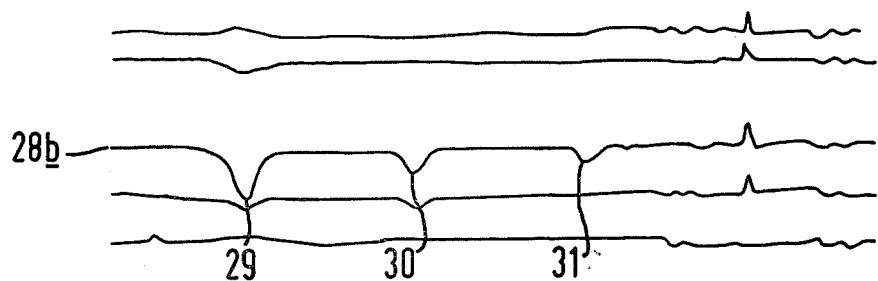
Figure 9A:
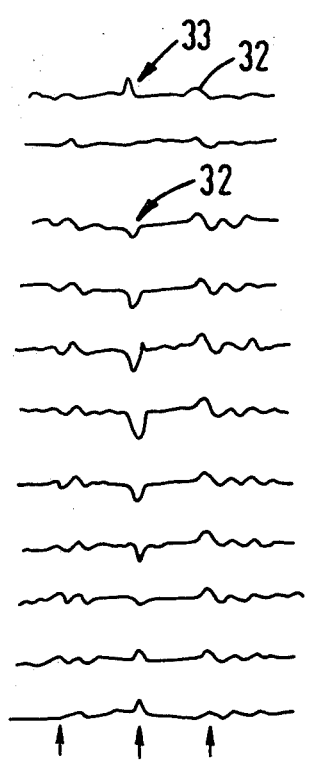
Figure 9B:
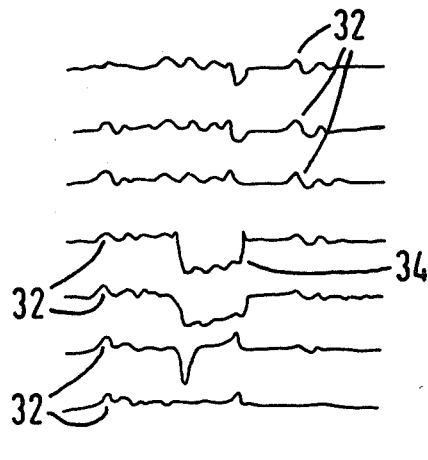
Figure 9C:
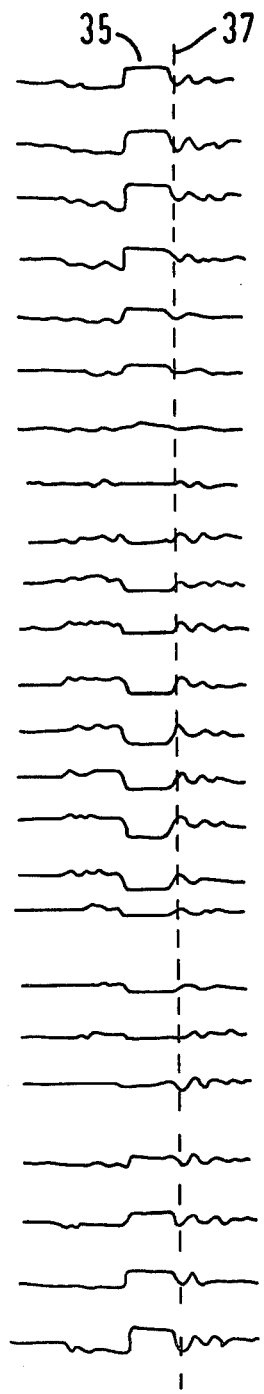

FIGS. 6a to c are diagrams to assist with the explanation of profile measurements;

FIG. 7 is a block diagram of a signal processing circuit;

FIG. 8 is a trace of a number of recorded signals;

FIGS. 9a to c are further traces of recorded signals;

FIG. 10 is a section through a test joint in a pipe;

FIG. 11 is a block diagram of a further signal processing circuit; and

FIG. 12 is a schematic diagram of a pig in accordance with further features of the invention.

Figure 1:
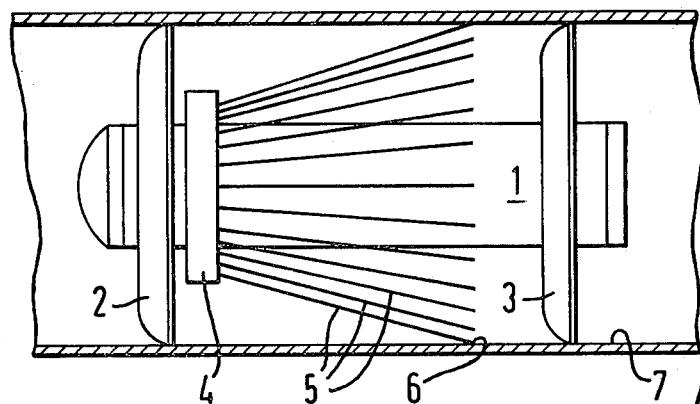
FIG. 1 shows schematically a pipeline inspection pig incorporating a plurality of probe arms.

Referring now to FIG. 1 of the drawings, an inspection pig has a narrow body 1 capable of passing obstacles such as dents or weld beads in a pipeline. It is held in position and driven by conventional flexible cups 2,3, and carries a transducer mounting ring 4 on which is mounted a plurality (typically at least 24, but possibly 60 or more) of probe arms 5. The probe arms are pivoted at the mounted ring and the free ends 6 bear against the internal surface 7 of the pipeline as it is traversed by the pig. In one embodiment (FIG. 2) a probe arm of length r carries a magnetic sensing coil 8 which pivots with the probe in a field created by bias coil windings 10,11. When the probe end bearing on the pipeline surface 12 is at a distance x from a notional reference cylinder 13 coaxial with the pig body, the arm makes an angle θ with the pig axis. The mounting arrangement for the probe transducers (FIG. 3) comprises a pair of blocks 14 adjacent a motion limiting stop 15. The end of the probe mounted by pivots 16 on the blocks comprises a carrier 17 for the sensing coil 8. The probe tip is urged in contact with the pipeline surface by a bias spring 18 engaging an eye 19 on the carrier 17. The field generating windings 10,11 are mounted on a steel collar 20 on the body 1 of the pig. An alternating field of frequency 1 kHz is convenient to generate and detect.

Figure 4:
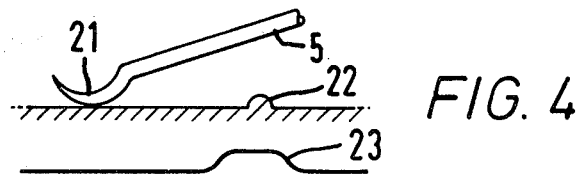
FIG. 4 shows one form of the end of a probe arm and the output signal of the associated transducer as it passes over a projection in a pipeline surface.

Preferably the surface follower tip 21 of the probe arm 5 (FIG. 4) has a relatively large radius (say 10 mm). This reduces drift due to probe tip wear during a run and also reduces the sensitivity to small surface features 22, as is indicated by the corresponding transducer output signal 23. (Since the signal from an "event" is spread by this means, the sampling rate can be reduced and the amount of data to be recorded is less). Alternatively, a small wheel or roller may be mounted on the end of the probe to achieve the same effect.

Figure 2:
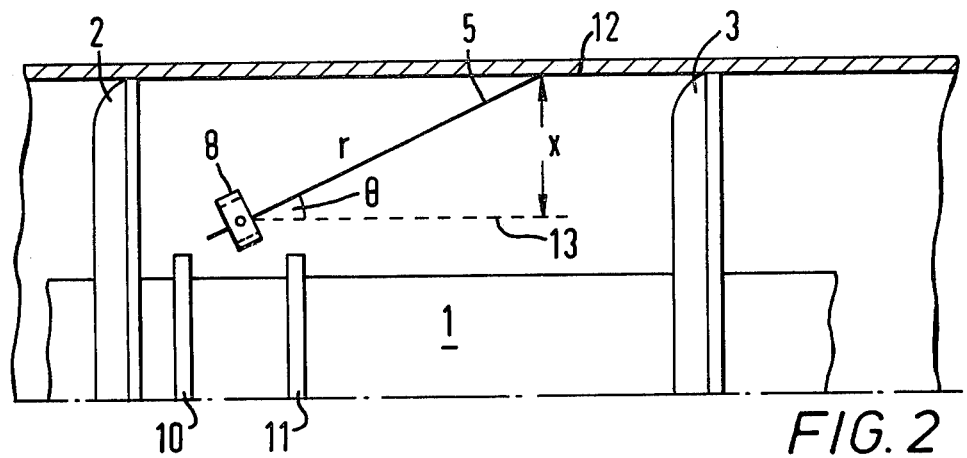
FIG. 2 shows one embodiment of a transducer suitable for converting mechanical movements to electrical signals.
Figure 3:
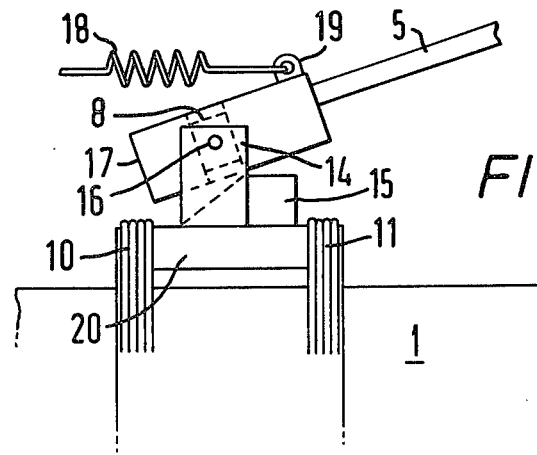
FIG. 3 shows part of the transducer of FIG. 2 in greater detail.

If the distance from the inner surface 12 of a pipeline (contacted by a probe) to the surface of a reference cylinder 13 is x, and the magnetic field created by the windings 10, 11 in the region of the pickup coils 8 is parallel to the reference cylinder, and if the axis of the sense coil 8 is normal to the probe arm, then the induced signal is given by $$V = \text{const. } \sin \theta$$

where $\theta$ is the angle made by the probe with the axis of the cylinder 13 (FIG. 2).

but $\sin \theta = x/r$ where r is the length of the probe, hence $V = \text{const. } x$, that is to say, it is proportional to the distance of the tip of the probe from the reference cylinder.

Figure 5:
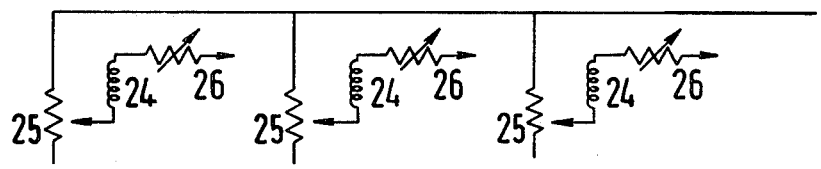
FIG. 5 shows a circuit arrangement in which an offset voltage is introduced into a number of transducer circuits.

In practice the pickup coils 8, represented diagrammatically by coil symbols 24 (FIG. 5), are fed with a signal $V_A$ in antiphase to the signal applied to the windings 10,11 of the drive coils. The magnitude of this signal is adjusted by means of potentiometers 25 to provide an offset voltage proportional to the nominal spacing between the pipeline surface and the reference cylinder. This ensures that the output signals from the pick-up coils represent departures from the nominal spacing and provides better utilisation of the dynamic range of the recording arrangements. Individual coils are trimmed with trimmer resistors 26.

An example of a typical group of probe measurements $x_1$, $x_2$, etc., is depicted in FIGS. 6a and 6b with the corresponding output voltages V reduced by the offset $V_o$ shown in FIG. 6c. In this example the effect of a dent 9 in the pipeline 15 is shown.

The signals from the probe transducers are fed to the inputs 27 of a pair of multiplexers Ma,Mb (FIG. 7) which are switched by a clock C so that the outputs at any given instant are those of diametrically opposite probes. These outputs are fed to an adder A whose output signal is an indication of the pipe diameter at that orientation irrespective of any transverse movement of the pig. This signal from the adder A is fed to a differential amplifier D, the other input of which is fed from a voltage source S which generates a voltage equivalent to the average diameter of the pipe. The output from the differential amplifier is fed to a comparator circuit E which generates an output if the departure from nominal diameter exceeds a predetermined threshold, and is utilised in the subsequent data processing circuits to flag significant data and thereby reduce the time required to analyse data retrieved from an inspection run. The departure from nominal diameter by more than the predetermined value is referred to as a significant non-roundness event (SNORE).

When processing data, the SNORE signal is used as a selection flag and readings are taken from the tape for a sufficient distance to display the event which caused the generation of the SNORE signal. Conveniently, the SNORE signal is monitored when the tape is rewound at the end of a measuring run. The SNORE signal is used as a trigger to cause the tape to run forward at normal replay speed for a few seconds whilst the relevant data are read out.

Conveniently more than one threshold level may be set and SNORE signals corresponding to each threshold recorded. In one embodiment a signal of $-1$ V was set for a threshold of $\pm 3.8$ mm and a signal of $+1$ V for a threshold of $\pm 7.6$ mm.

The advantage of this system is that, as all data are recorded continuously, they can be examined to whatever degree of precision is appropriate at the time.

Features of the traces of recorded data channels (probe signals are depicted in FIG. 8. A square wave signal 28a on one channel records the distance travelled by the pig whilst another channel 28b depicts the traces 29,30,31 corresponding to depressions of 7.4 mm, 3.7 mm and 2.2 mm.

Yet further replay traces are shown in FIGS. 9a and 9b which illustrate signals 32 due to pig bounce when it hits an obstruction, and obstruction signals caused by an outgoing 33 and an ingoing 34 probe arm movement.

FIG. 9c shows the traces 35 when the probes strike an eccentric flange ring 36 (FIG. 10). Sinusoidally varying signals 37 due to pig bounce are also displayed.

On replay the analogue outputs 38 (FIG. 11) from the twenty-four data channels can be fed to a multiplexer 39 which is coupled by an analogue/digital converter 40 to a data store 41. An oscillator 42 synchronised with the multiplexer clock signals fed through a frequency divider 43 gives a sinusoidal output which is fed to an oscilloscope to display a reference circle with which the data signals may be compared.

Other features may be incorporated without departing from the ambit of the invention. For example, a tandem pig arrangement as shown in FIG. 12 may have a first pig 45 carrying a single bank 46 of probes to monitor profile coupled to a second pig 47 having three banks 48,49,50 of probes to monitor pipeline curvature.

I claim:

1. An apparatus for monitoring the topography of the internal surface of a pipe, said device comprising a carrier member which is movable within the pipe to be monitored; means attached to said carrier member to enable said carrier member to be moved along the pipe; a plurality of sensor means mounted around said carrier member for monitoring the contour of the internal surface of the pipe at a corresponding number of points as the carrier moves along the pipe, each sensor means including a feeler arm which is pivotally mounted at a first end thereof to the carrier member and including a sensing tip at its second end which contacts the internal surface of the pipe, each said feeler arm including a magnetic sensing coil near its first end; spring means attached to each said feeler arm to bias its position such that the sensing tip at its second end is in continuous contact with the internal surface of the pipe as said carrier member moves along the pipe; bias coil windings connected to said carrier member to create an alternating magnetic field in which each said magnetic sensing coil will be movable as the respective feeler arms pivot due to irregularities detected in the internal surface of the pipe by the sensing tip thereof; means for supplying a controlled, induced voltage to each said magnetic sensing coil; means for processing the signals emitted from said magnetic coils, said signal processing means including at least two multiplexers to which the signals from said magnetic sensing coils are fed, an adder to which the output signals from each of said multiplexers are fed, a voltage signal member for generating a signal representative of the nominal diameter of the pipe, a differential amplifier to which the output signals from both said adder and said voltage signal member are fed, means providing a predetermined threshold voltage representing permissible departure from roundness, and a comparator means to which the signals from said differential amplifier and said means providing a predetermined threshold voltage are fed, said comparator means providing respective output signals if the voltage signals from the differential amplifier exceed the predetermined threshold voltage; and means for recording the output signals from said comparator means.

* * * * *